(12) United States Patent
Viel (10) Patent No.: US 9,942,196 B2
(45) Date of Patent: Apr. 10, 2018

(54) CANONICAL NETWORK ISOLATOR COMPONENT

(71) Applicant: The Johns Hopkins University, Baltimore, MD (US)

(72) Inventor: David W. Viel, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 330 days.

(21) Appl. No.: 14/266,862

(22) Filed: May 1, 2014

(65) Prior Publication Data

US 2015/0319188 A1    Nov. 5, 2015

(51) Int. Cl.
*G06F 12/16* (2006.01)
*H04L 29/06* (2006.01)

(52) U.S. Cl.
CPC ...... *H04L 63/0209* (2013.01); *H04L 63/1441* (2013.01)

(58) Field of Classification Search
CPC .................................................. H04L 63/1441
See application file for complete search history.

(56) References Cited

U.S. PATENT DOCUMENTS

| | | | |
|---|---|---|---|
| 6,651,062 B2 | 11/2003 | Ghannam et al. | |
| 7,159,036 B2 | 1/2007 | Hinchliffe et al. | |
| 7,191,438 B2 | 3/2007 | Bryant | |
| 7,392,534 B2 | 6/2008 | Lu et al. | |
| 7,716,726 B2* | 5/2010 | Phillips | H04L 63/0263 713/154 |
| 8,059,546 B2* | 11/2011 | Pai | H04L 12/2801 370/236 |
| 8,181,239 B2* | 5/2012 | Pandya | H04L 63/0218 370/469 |
| 8,200,700 B2* | 6/2012 | Moore | G06F 17/30575 707/791 |
| 8,984,205 B2* | 3/2015 | Robillard | G06F 21/85 710/314 |
| 2008/0063190 A1* | 3/2008 | Campagna | H04L 9/0643 380/44 |
| 2009/0172431 A1* | 7/2009 | Gupta | G06F 13/102 713/320 |
| 2010/0186087 A1* | 7/2010 | Bolton | H04N 21/2389 726/22 |

(Continued)

*Primary Examiner* — Khoi Le
(74) *Attorney, Agent, or Firm* — Noah J. Hayward (57) ABSTRACT

A method for isolating a computer platform includes receiving a service request from an external requestor via a network at processing circuitry associated with a hardware barrier between the computer platform and the network, causing the service request to be loaded into a first buffer having a dual port connection to a corresponding second buffer of the computer platform, providing an indication to the computer platform to indicate the service request is loaded into the first buffer to be pulled into the second buffer of the computer platform, responsive to processing of the service request by the computer platform, receiving a message indicating a response loaded in the second buffer has been pushed to the first buffer, and communicating the response to the external requestor. The buffers form the only access point to the computer platform. The indication is the only communication initiated from the external requestor that crosses the hardware barrier without control by the computer platform.

17 Claims, 4 Drawing Sheets

(56) References Cited

U.S. PATENT DOCUMENTS

| | | | |
|---|---|---|---|
| 2012/0180124 A1* | 7/2012 | Dallas | G06F 21/46 726/22 |
| 2013/0208592 A1* | 8/2013 | Lu | H04L 47/10 370/231 |
| 2013/0212321 A1* | 8/2013 | Talagala | G06F 12/0246 711/103 |
| 2013/0298244 A1* | 11/2013 | Kumar | G06F 21/52 726/25 |

* cited by examiner

CANONICAL NETWORK ISOLATOR COMPONENT

TECHNICAL FIELD

Example embodiments generally relate to isolation techniques for providing secure access to computer platform resources and, in particular, relate to an isolator and method of isolation for providing security relative to access of the computer platform resources by a network or other platform interfaces.

BACKGROUND

Computer systems today are vulnerable to a variety of malicious attacks that compromise system integrity in a number of ways. Some examples of these attacks may include denial-of-service attack (where computer functionality is unavailable to users), stealing secrets (where confidential information on the computer is made known to an unauthorized user, and corruption of functionality (where an unauthorized user invokes computer functionality but incorrect behavior results.

Computer systems are vulnerable to these kinds of attacks primarily because computers were not designed from inception with the intent of providing security against these kinds of attacks. Instead, computer vendors attempt to patch security functionality onto their existing systems in response to each new threat that is discovered. The result is a mixture of security relative components that attempt to provide security in their aggregate behavior. However, experience has shown that this type of "defense in depth" strategy has not been effective at deterring the most capable attackers and that new computer vulnerabilities and corresponding exploits continue to appear. Vendors and attackers are therefore engaged in a tit-for-tat struggle of exposing new exploits and then securing against each exposed exploit.

To avoid the type of reactive posture that vendors typically tend to take, it may be desirable to provide a structure that is designed to be secure at its core, and therefore is less likely to be exposed to continued development of exploits. Accordingly, it may be desirable to continue to develop improved and/or more efficient mechanisms by which protection against malware may be provided.

BRIEF SUMMARY OF SOME EXAMPLES

Accordingly, some example embodiments may provide a computer system "security by design" that is enabled via the provision of a computer interface that employs basic but effective security principles. Some example embodiments may therefore provide a hardware interface that is targeted to break the cycle described above. In this regard, for example, some embodiments may provide a Pull-Push Super-Typing Architecture (PPSTA) that allows the employment of a Canonical Network Isolator Component (C-NIC) as a security interface.

In an example embodiment, a method for isolating a computer platform is provided. The method may include receiving a service request from an external requestor via a network at processing circuitry associated with a hardware barrier between the computer platform and the network, causing the service request to be loaded into a first buffer having a dual port connection to a corresponding second buffer of the computer platform, providing an indication to the computer platform to indicate that the service request is loaded into the first buffer to be pulled into the second buffer of the computer platform, responsive to processing of the service request by the computer platform, receiving a message indicating that a response loaded in the second buffer has been pushed to the first buffer, and communicating the response to the external requestor. The first and second buffers may form the only access point to the computer platform. The indication may be the only communication initiated from the external requestor that crosses the hardware barrier without control by the computer platform.

In another example embodiment, an apparatus for isolating a computer platform is provided. The apparatus may include a canonical network interface controller card including processing circuitry and a first buffer. The first buffer may have a dual port connection to a corresponding second buffer of the computer platform. The first and second buffers may form the only access point from the network to the computer platform. The canonical network interface card may be provided between a network and the computer platform. The processing circuitry may be configured for receiving a service request from an external requestor via the network, causing the service request to be loaded into the first buffer, providing an indication to the computer platform to indicate that the service request is loaded into the first buffer to be pulled into the second buffer of the computer platform, responsive to processing of the service request by the computer platform, receiving a message indicating that a response loaded in the second buffer has been pushed to the first buffer, and communicating the response to the external requestor. The indication may be the only communication initiated from the external requestor that crosses passes through the canonical network interface card to the computer platform outside control of the computer platform.

BRIEF DESCRIPTION OF THE SEVERAL VIEWS OF THE DRAWING(S)

Having thus described some example embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments of the present invention may relate to the provision of security against malicious software or other attacks on network resources. Some example embodiments may provide a structure and method for PPSTA by employing three security related operations that combine to provide a secure architecture that can break the cycle described above. In this regard, for example, the structure and method described herein may secure a computer platform that offers services to external requestors across an interface. The services may be specified at a detailed level allowed by the computer architecture. In modern computer systems, this may be considered to be the bit granularity level, as the systems are designed to use arrays of binary bits for storage of data. As such, all services offered by the computer platform may be specified as a specific bit array pattern of data, and only those specific configurations that are specified and recognizable may be allowed through the interface.

Figure 3:
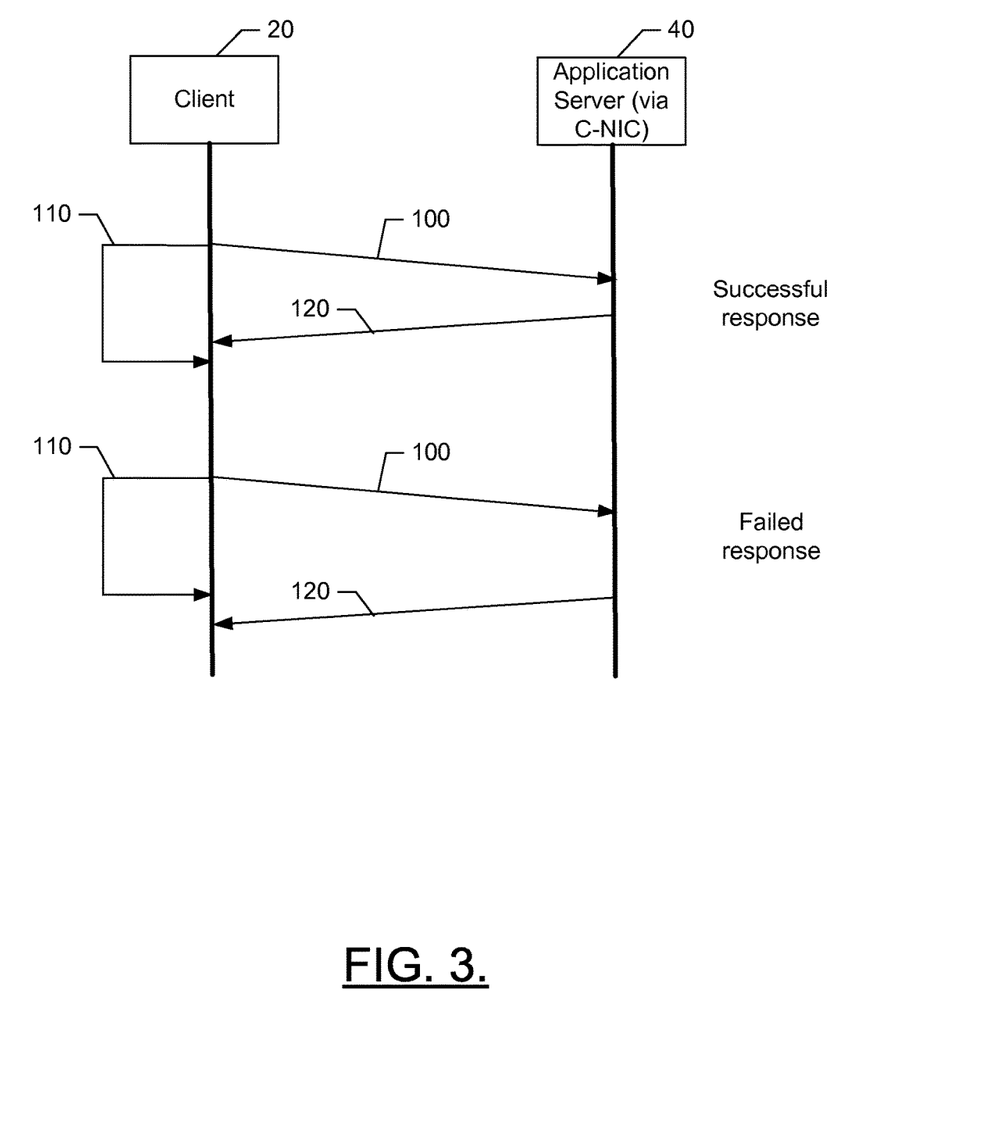
FIG. 3 illustrates a process flow diagram illustrating a communication protocol that may be employed by an apparatus or system configured in accordance with an example embodiment.

Generally speaking, example embodiments may employ a hardware barrier at a computer interface with the platform that is being protected. The presence of the hardware barrier at the interface may ensure that an external requestor is unable to directly access the computer system's internal resources. As such, the hardware barrier may enable the protected platform to restrict access to its internal resources, and to control the provision of resources on its own terms. In this regard, example embodiments may also employ a highly restrictive data type system relative to all data that traverses the interface via the hardware barrier. Finally, example embodiments may employ a protocol of interaction between the external requestor and the computer platform (e.g., as shown in FIG. 3). The combination of the hardware barrier, the data type system and the protocol of interaction may provide a robust security mechanism that does not have to be continually patched to react to security breaches that are discovered, but that is fundamentally protected.

Figure 1:
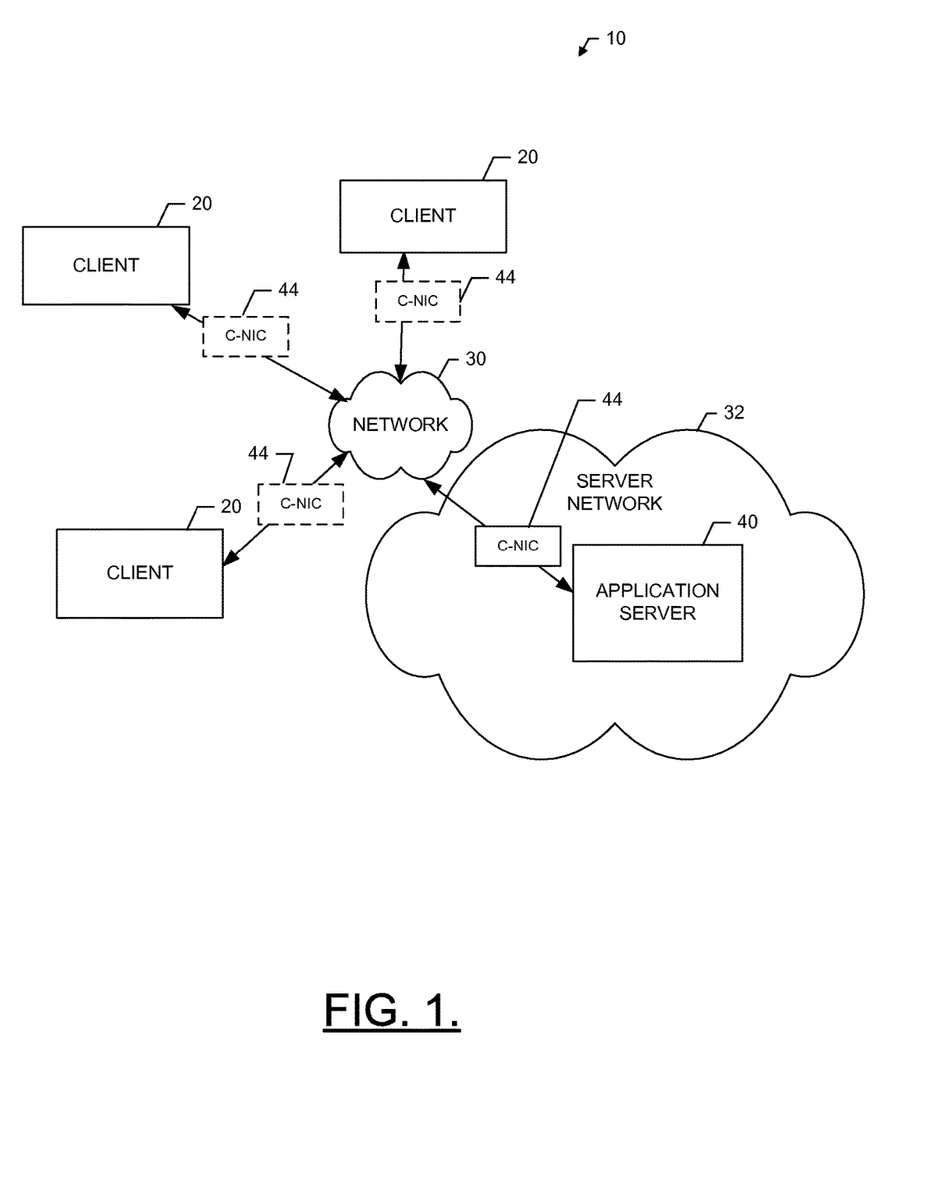
FIG. 1 illustrates a functional block diagram of a system that may be useful in connection with providing component isolation according to an example embodiment.

Example embodiments may be practiced in connection with a number of different network structures and with various different specific hardware components. Thus, FIG. 1 below should be understood merely to represent a basic system structure to which one example embodiment may be applicable. An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, embedded computer, controller, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, the clients 20 may include software for enabling them to communicate with the network 30 for requesting and/or receiving information and/or services via the network 30. The information or services receivable at the clients 20 may include deliverable components (e.g., downloadable software to configure the clients 20, or information for consumption/processing at the clients 20). As such, for example, each of the clients 20 may include corresponding executable instructions for configuring the client 20 to provide corresponding functionalities for communicating, processing data and/or requesting services as described in greater detail below.

The network 30 may be a data network, such as a local area network (LAN), a metropolitan area network (MAN), a wide area network (WAN) (e.g., the Internet), point-to-point network, and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), which together may form respective elements of a server network 32. The application server 40 may include hardware and/or software for configuring the application server 40 to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated.

In an example embodiment, the application server 40 may be protected with a security device of an example embodiment. In this regard, the application server 40 may be protected by a C-NIC 44 that may be structured in accordance with an example embodiment, and which may be provided at the interface between the application server 40 and the network 30. It should be appreciated that other servers of the server network 32 (and even the clients 20 in some cases) may also include respective instances of the C-NIC 44 for securing each respective asset of the network. The C-NIC 44 may be a hardware interface that employs the restrictive data type system mentioned above along with a protocol of interaction between external requestors (e.g., the clients 20) and the protected platform (e.g., application server 40). As suggested above, it should further be appreciated that in some cases, the clients 20 may also be protected by respective instances of the C-NIC 44. Messages outgoing autonomously from the clients 20 may therefore be processed by the C-NIC 44 as well.

In an example embodiment, the application server 40 may include or have access to memory (e.g., internal memory)

for storing instructions or applications for the performance of various functions and a corresponding processor for executing stored instructions or applications. For example, the memory may store data or instructions associated with service provision. In this regard, for example, the C-NIC 44 may include hardware and/or software for enabling the application server 40 to communicate with the network 30 and/or the clients 20 for the provision and/or receipt of information/services in a protected or secure way as described herein. As such, the environment of FIG. 1 illustrates an example in which provision of services, content and information may be accomplished by a particular entity (namely the application server 40) without compromising security of the entity relative to the behavior of the clients 20.

Figure 2:
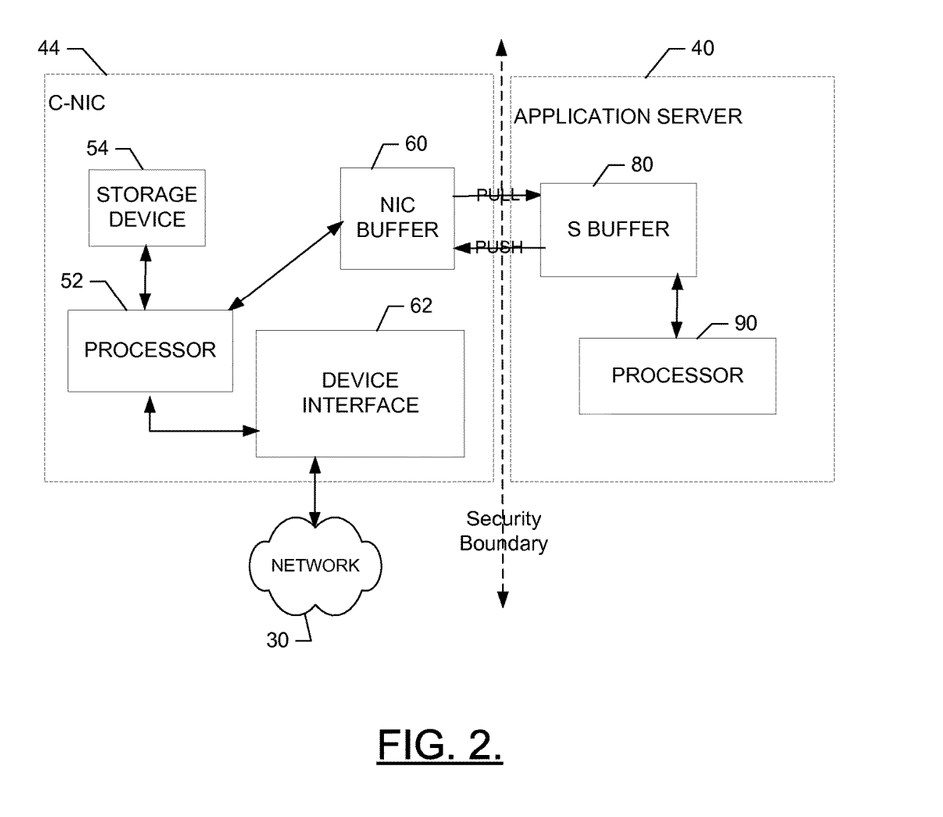
FIG. 2 illustrates a functional block diagram of an apparatus that may be useful in connection with providing component isolation according to an example embodiment.

An example embodiment of the invention will now be described with reference to FIG. 2. FIG. 2 shows certain elements of an apparatus for provision of security to an entity or network platform (e.g., the application server 40) according to an example embodiment. The apparatus of FIG. 2 may be employed, for example, as an interface for a client (e.g., any of the clients 20 of FIG. 1) or a variety of other devices (such as, for example, a network device, server, proxy, or the like (e.g., the application server 40 of FIG. 1)). It should be noted that the devices or elements described below may not be mandatory and thus some may be omitted in certain embodiments.

Referring now to FIG. 2, a block diagram showing the C-NIC 44 and its interface with a protected component (e.g., the application server 40) is provided. The C-NIC 44 may act as a hardware barrier, as described above by virtue of the components arranged therein, and by virtue of the data typing and protocol employed in connection with communications with the application server 40. As shown in FIG. 2, the C-NIC 44 may include processing circuitry that is configured to perform data processing, application execution and other processing and management services according to an example embodiment of the present invention. In one embodiment, the processing circuitry may include a storage device 54 and a processor 52 that may be in communication with or otherwise control a NIC Buffer 60 and a device interface 62. As such, the processing circuitry may be embodied as a circuit chip (e.g., an integrated circuit chip) configured (e.g., with hardware, software or a combination of hardware and software) to perform operations described herein.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In some embodiments, the device interface 62 may be embodied as a TCP/IP chip configured to enable wireless or wired communication with networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), programmable logic, a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 may receive a request from the network 30 (e.g., based on a client 20 request) and may load data associated with the request into the NIC buffer 60. The NIC buffer 60 may be a storage register or memory location that may be the only way through which data may be passed on to the application server 40. As such, in some cases, the NIC buffer 60 may be a designated portion of the storage device 54 or a separate buffer or memory location that is known and trusted from the perspective of the application server 40. The NIC buffer 60 may be in communication with a corresponding buffer (e.g., S buffer 80) of the application server 40. The application server 40 may also employ processing circuitry including at least a processor 90 that may be similar in capability and/or structure to that of the processor 52 described above.

In practice, when a request is received from the network 30, the processor 52 may be configured to issue a signal from the C-NIC 44 to let the application server 40 know that a request for data is available. The request may be loaded into the NIC buffer 60. This may be akin to ringing a doorbell at someone's home to let them know that a package is being placed outside for them to receive. As part of the security that is conducted in accordance with an example embodiment, the request may be pulled from the NIC buffer 60 to the S buffer 80 and analyzed by the data typing described below. To the extent the processor 90 determines that the request can be responded to, the response is placed in the S buffer 80 and pushed to the NIC buffer 60. The application server 40 then sends the C-NIC 44 an indication that return data is available. The response may then be communicated back through the network 30.

The C-NIC 44 therefore acts as a hardware barrier to prevent the external requestor from accessing the resources of the application server 40 directly. Instead, the external requestor places its service request in an input data storage area (i.e., the NIC buffer 60) that is well known, but external, to the application server 40. A single request signal may then be sent to notify the application server 40 that the service request is waiting. The request signal is the only data interaction that can be initiated by the external requestor with the application server 40. As mentioned above, the application server 40 may then pull the service request data from the NIC buffer 40 through the hardware barrier and into the S buffer 80 for further processing.

The further processing may include a "super-typing" operation that is performed on the request data. Super-typing may be a bit-level integrity check as to whether the request data matches one of a series of published services provided by the application server 40. The service request may include a name of the request and a sequence of zero or more data arguments. The name may be encoded as a specific array of bits having a known length. An argument "super-type" may be defined by three parameters including storage, format and type. The storage may be the number of binary bits in the argument bit array, and may be a positive integer from 1 to a maximum length specified by the service interface. The format may be a name that determines how the array of bits is to be interpreted semantically by the application server 40. As such, for example, the format may define an interpretation of the bits by the computer system. These may correspond to the common formats used by modern computer systems such as, for example, ASCII characters, 2s-complement integers, IEEE floating point encoding, or may be uniquely defined by the service interface (e.g., Boolean expressions, real numbers, integers, etc.). The type may be a set of bit patterns allowed for a given argument.

A request that is received and passes all of the super-typing validations may be deemed to be a properly formed request. Properly formed requests may be processed by the application server 40. Any request that does not pass the super-typing validations may be deemed to be a malformed request and may be discarded. In this way, a computer platform (e.g., the application server 40) may assume a defensive posture where only exactly correct service requests are processed and any other requests received from the external requestor may be ignored.

An example of a service request may be a system that installs car wheels. The service name may be "install wheel," which may be specified as ASCII text. The service may take one argument, wheel number, which has storage of 32 bits, a format of 2s-compliment integer "big endian," and a value set of {0, 1, 2, 3}. The name may be 23 ASCII characters taking 104 bits. The argument may be 32 bits, but only 2 bits may be needed to encode the four allowed values. The remaining bits may therefore be zero.

A service may specify zero or more return values that are sent in the response to the external requestor at the completion of the service request. Thus, either two-way (i.e., messages having one or more return values specified) or one-way messages (i.e., messages having zero return values specified) may be specified. These return values are "super-typed" in the same way as the input arguments, with the storage, format and type specified for each. The application server 40 then pushes the return response through the hardware barrier to the NIC buffer 60 and sends a signal to inform the external requestor component that the response is available. This completes the service request.

The C-NIC 44 and application server 40 also communicate with each other in conformance with a protocol that may be considered to be a simple unreliable asynchronous messaging protocol. FIG. 3 illustrates a control flow diagram showing the mechanics of the protocol. However, it should be appreciated that FIG. 3 merely illustrates one example, and example embodiments may also be practiced in connection with synchronous and reliable communication paths as well. Referring to FIG. 3, a service request 100 may be sent by the client 20 at any time since the protocol applies to asynchronous messaging. Furthermore, since it is understood that in this system, the connection from the requestor (e.g., client 20) to the computer platform interface (e.g., the C-NIC 44) could lose service protocol packets at any time, the system is also considered "unreliable". When the service request 100 is sent, the client 20 also starts a timer or timeout clock 110 if a response value packet is specified for the service. If the packet arrives at the computer platform interface, the packet is serviced using the PPSTA method described above and a response packet 120 is sent out from the computer platform interface (e.g., the C-NIC 44 that interfaces with the application server 40) to the client 20. If the response packet 120 arrives at the client 20 before the timeout expires, the service request is successfully completed. However, if the response packet fails to arrive before the timeout expires, then the service request has failed. Both options are shown in FIG. 3. It is up to the client 20 to determine what, if any, further action to take. The C-NIC 44 will only provide a response in the event that a properly formed request is received as described above. If a properly formed request is not received, the C-NIC 44 will not even pass along an acknowledgement or any indication that the request failed to the requestor. Acknowledgements or indications of failed requests can be useful information for some attempted exploits and may serve as information leaks. Example embodiments therefore avoid leaking any such information.

Example embodiments generally also prevent any external entity from directly accessing the resources of an isolated component of the computer system (e.g., the application server 40). External entities may also be prevented from encoding one data type into another data type to exploit the computer system. This may result in significantly reduced vulnerability to "fuzzing" attacks. Accordingly, the "trust" in computer systems that implement PPSTA may be significantly higher than for traditional computer systems.

In various example embodiments, extensions or modifications to the description provided above may also be incorporated. For example, in some cases, if the requestor (e.g., one of the clients 20) is one of a plurality of different requestors, a return address may be placed in the NIC buffer 60. The return address may then be used to return the response to the correct requestor. A return address may be included in the request as an argument by the external requestor. In some cases, the return address that is specified may be an address of an entity other than the external requestor.

In some examples, the external requestor may send a request over an unsecured channel, which would render the request data vulnerable to viewing by unauthorized users. The request could therefore be encrypted such that an encrypted request is placed in the NIC buffer 60 for transfer to the S buffer 80. When the encrypted request is pulled into the S buffer 80, the encrypted request may be decrypted as a first phase of the super-typing input validation. The super-typing may then proceed as described above. The response may be encrypted by the computer system and then may be pushed to the NIC buffer 60 for return to the requestor.

In some embodiments, a secret password may be provided by the external requestor within the request to identify the requestor to the application server 40. The application server 40 may then validate the identity of the requestor as part of the input validation process. In some cases, a nonce may be supplied as a data argument by the external requestor. A response may be returned to the requestor so that the requestor can match responses with requests based on the nonce. Extra random bits may therefore be added to provide entropy, and/or fixed length packets may be used to prevent identification of packet contents. Packet identifiers may be tracked by the server, and duplicates may be dropped in order to prevent man-in-the-middle attacks. Accordingly, the PPSTA described herein may be used in connection with control systems, telecom systems, combat systems, space systems, financial systems, payment systems and/or the like.

The C-NIC 44 may therefore be a device that implements the PPSTA. The C-NIC 44 may therefore be embodied as a network interface component that is a peripheral device for a computer platform, and corresponding software or other configuration components on both the C-NIC 44 and the application server 40. An IP network interface device, a processor and a dual ported memory device (to accommodate push and pull signal transfers) may therefore form the C-NIC 44 as shown above. The dual ported memory device (e.g., NIC buffer 60) may be operably coupled to the processor on one side and may be operably coupled to a corresponding buffer (e.g., S buffer 80) on the other side. In some examples, the network interface device (e.g., device interface 62) may interface with the C-NIC 44 via the Internet Protocol (IP) network and deliver IP network UDP packets to the processor. However, as mentioned below, other protocols (e.g., a proprietary level 4 protocol) may also be employed. The processor 52 of the C-NIC 44 may execute instructions to unpack received UDP packets and place the payload in the input region of the dual ported memory (e.g., the NIC buffer 60) from the network side. The processor 52 may then signal the application server 40 through the dual ported memory signaling mechanism that a service request is waiting to be processed. The computer platform (e.g., application server 40) may then execute instructions to pull the waiting packet into computer memory for processing (e.g., via the processor 90) in accordance with the PPSTA method described above.

If PPSTA processing is successful (i.e., if the request for properly formed), the computer platform may execute instructions to push the result to the output region of the dual ported memory (e.g., NIC buffer 60) from the computer platform (e.g., from the S buffer 80). The processor 90 may then signal the processor 52 to let the C-NIC 44 know that the response is waiting for transmission to the service requestor. The NIC processor 52 may pack the data into a UDP packet (or proprietary level 4 protocol packet) with the requestor address and send the packet out on the network 30. Accordingly, the PPSTA may be implemented via communication drivers that direct operation of the processors of the system.

In some embodiments, the C-NIC 44 may further specify its own OSI level 4 protocol for packaging request and response messages. This OSI level 4 protocol may operate on top of the level 3 IP layer and replace other level 4 protocols such as TCP or UDP. However, in some cases such other level 4 protocols may additionally be employed instead of being replaced. In embodiments, in which the C-NIC 44 provides its own (e.g., proprietary) protocol, the protocol may be a simple protocol that places the service message, or encrypted service message, in the payload area of an IP packet and sets the IP level 4 specifier to a predetermined value (e.g., an experimental or other approved level 4 protocol value). The service messages may be placed in the payload area of UDP or TCP packets as well.

Figure 4:
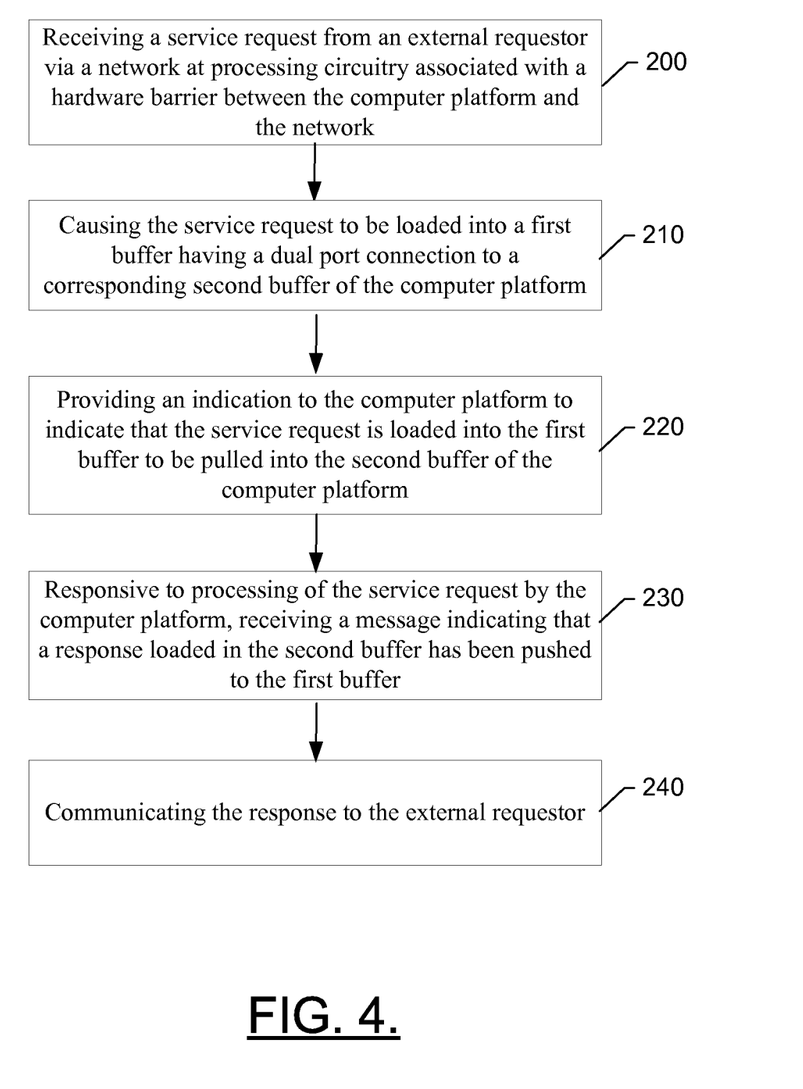
FIG. 4 illustrates a method of providing component isolation according to an example embodiment.

From a technical perspective, the C-NIC 44 and application server 40 (via the configuration of their respective processors) described above may be used to support some or all of the operations described above. As such, the platform described in FIGS. 1-3 may be used to facilitate the implementation of several computer program and/or network communication based interactions. As an example, FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., C-NIC 44, application server 40, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving a service request from an external requestor via a network at processing circuitry associated with a hardware barrier between the computer platform and the network at operation 200, causing the service request to be loaded into a first buffer having a dual port connection to a corresponding second buffer of the computer platform at operation 210, and providing an indication to the computer platform to indicate that the service request is loaded into the first buffer to be pulled into the second buffer of the computer platform at operation 220. In some embodiments, the method may further include, responsive to processing of the service request by the computer platform, receiving a message indicating that a response loaded in the second buffer has been pushed to the first buffer at operation 230, and communicating the response to the external requestor at operation 240.

In the context of the operations described above, it should be understood that the first and second buffers may form the only access point to the computer platform from the network. Additionally, the indication is the only communication initiated from the external requestor that crosses the hardware barrier without control by the computer platform. In this regard, the indication is provided based on the fact that the external requestor has provided the service request. However, no portion of the request is actually pushed through to the computer platform. Instead, it is loaded into the first buffer for the computer platform to control transfer to the second buffer and further control super-typing the message before determining whether to respond at all in connection with the protocol described above. Thus, the computer platform controls the extraction of the contents of the service request and the external requestor does not have the ability to push any content, instructions or data to the computer platform that is outside the control of the computer platform.

In an example embodiment, an apparatus for performing the method of FIG. 4 above may comprise a processor (e.g., the processor 52) or processing circuitry configured to perform some or each of the operations (200-240) described above. The processor may, for example, be configured to perform the operations (200-240) by performing hardware implemented logical functions, executing stored instructions, or executing algorithms for performing each of the operations. In some embodiments, the processor or processing circuitry may be further configured for additional operations or optional modifications to operations 200 to 240. In this regard, for example, processing the reference binary codes may include converting the reference binary codes into source code (or other functional representation code) and breaking the source code into individual functions. In some cases, processing the reference binary code may further include assigning a respective token to each corresponding unit portion of each respective one of the individual functions, and mapping each token to a character to define an ordered string of characters that form the compressed representation.

In some cases, services requested of the computer platform are identified by a unique identifier, and service requests passing through the hardware barrier are specified by a super-type comprising a storage identifier, a format identifier and a type identifier. In some embodiments, the format identifier may include an integer, a real number, a character, a Boolean expression, a IEEE floating point encoding value, or an ASCII code. In an example embodiment, a list of service identifiers provided by the computer platform may be compared to the unique identifier to enable, responsive to a match between the unique identifier and one of the service identifiers on the list, the service request to be processed at the computer platform. In some cases, a service argument associated with the service request may be copied to the first buffer and a value of the service argument may be compared against a list of argument types provided by the computer platform to enable, responsive to a match between the argument types on the list and the service argument, the service request to be processed at the computer platform. No response may be provided to the requestor in response to the timer timing out. In an example embodiment, the service request may be encrypted. In some cases, a nonce, secret, or return address may be included in the service request. In some examples, the nonce may be retained and returned in the response. In some embodiments, the nonce of a packet may be examined to ensure that the packet is unique. In an example embodiment, decryption may be attempted on encrypted service request data, and no response may be provided to the requestor in response to decryption failing. In some cases, entropy bits may be appended as service arguments or added to the service arguments.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method for isolating a computer platform, the method comprising:

receiving an encrypted service request from an external requestor via a network at processing circuitry associated with a hardware barrier defining a security boundary between the computer platform and the network, wherein the network comprises a data network configured to enable communication between two or more computing devices;

causing the encrypted service request to be loaded into a first buffer having dual ports that are connected to corresponding dual ports of a second buffer of the computer platform to form a dual port connection between the first buffer and the second buffer, the dual port connection between the first buffer and the second buffer extending across the security boundary;

providing an indication to the computer platform to indicate that the encrypted service request is loaded into the first buffer to be pulled into the second buffer of the computer platform;

responsive to processing of the encrypted service request by the computer platform, receiving a message indicating that a response loaded in the second buffer has been pushed to the first buffer;

attempting decryption on encrypted service request data of the encrypted service request; and communicating the response to the external requestor, wherein the first and second buffers form the only access point to the computer platform, and wherein the indication is the only communication initiated from the external requestor that crosses the hardware barrier without control by the computer platform, and wherein no response is provided to the external requestor in response to decryption failing.

2. The method of claim 1, wherein a service of the encrypted service request of the computer platform is identified by a unique identifier, and wherein the encrypted service request passing through the security boundary is specified by a super-type comprising a storage identifier, a format identifier and a type identifier.

3. The method of claim 2, wherein the format identifier comprises an integer, a real number, a character, a Boolean expression, a IEEE floating point encoding value, or an ASCII code.

4. The method of claim 2, wherein a list of service identifiers provided by the computer platform is compared to the unique identifier to enable, responsive to a match between the unique identifier and one of the service identifiers on the list, the encrypted service request to be processed at the computer platform.

5. The method of claim 2, wherein a service argument associated with the encrypted service request is copied to the second buffer and a value of the service argument is compared against a list of argument types provided by the computer platform to enable, responsive to a match between the argument types on the list and the service argument, the encrypted service request to be processed at the computer platform.

6. The method of claim 1, wherein a service associated with the encrypted service request specifies zero or more return values to be sent in the response to the external requestor at completion of the encrypted service request.

7. The method of claim 1, wherein a nonce, secret, or return address is included in the encrypted service request.

8. The method of claim 7, wherein the nonce is retained and returned in the response.

9. The method of claim 7, wherein the nonce of a packet is examined to ensure that the packet is unique.

10. The method of claim 1, wherein entropy bits are appended as service arguments or added to the service arguments.

11. An apparatus for isolating a computer platform, the apparatus comprising:

a canonical network interface controller card including processing circuitry and a first buffer, the first buffer having dual ports that are connected to corresponding dual ports of a second buffer of the computer platform to form a dual port connection between the first buffer and the second buffer, the dual port connection between the first buffer and the second buffer extending across a security boundary between the computer platform and the network, the first and second buffers forming the only access point from a network to the computer platform, the canonical network interface card being provided between the network and the computer platform, wherein the network comprises a data network configured to enable communication between computing devices, wherein the processing circuitry is configured for:

receiving an encrypted service request from an external requestor via the network;

causing the encrypted service request to be loaded into the first buffer;

providing an indication to the computer platform to indicate that the encrypted service request is loaded into the first buffer to be pulled into the second buffer of the computer platform;

responsive to processing of the encrypted service request by the computer platform, receiving a message indicating that a response loaded in the second buffer has been pushed to the first buffer;

attempting decryption on encrypted service request data of the encrypted service request; and communicating the response to the external requestor, wherein the indication is the only communication initiated from the external requestor that crosses through the canonical network interface card to the computer platform outside control of the computer platform, and wherein no response is provided to the requestor in response to decryption failing.

12. The apparatus of claim 11, wherein a service of the encrypted service request of the computer platform is identified by a unique identifier, and wherein the encrypted service request passing through the security boundary is specified by a super-type comprising a storage identifier, a format identifier and a type identifier.

13. The apparatus of claim 12, wherein the format identifier comprises an integer, a real number, a character, a Boolean expression, a IEEE floating point encoding value, or an ASCII code.

14. The apparatus of claim 12, wherein a list of service identifiers provided by the computer platform is compared to the unique identifier to enable, responsive to a match between the unique identifier and one of the service identifiers on the list, the encrypted service request to be processed at the computer platform.

15. The apparatus of claim 12, wherein a service argument associated with the encrypted service request is copied to the second buffer and a value of the service argument is compared against a list of argument types provided by the computer platform to enable, responsive to a match between the argument types on the list and the service argument, the encrypted service request to be processed at the computer platform.

16. The apparatus of claim 11, wherein a service associated with the encrypted service request specifies zero or more return values to be sent in the response to the external requestor at completion of the encrypted service request.

17. The apparatus of claim 11, wherein a nonce, secret, or return address is included in the encrypted service request.

* * * * *